US008378219B2

(12) United States Patent
Lesieur et al.

(10) Patent No.: US 8,378,219 B2
(45) Date of Patent: Feb. 19, 2013

(54) NESTING DIELECTRIC INSULATORS

(75) Inventors: Thomas N. Lesieur, Murfreesboro, TN (US); Timothy P. O'Leary, Antioch, TN (US); Wesley Travis, Murfreesboro, TN (US); David O. Plummer, Murfreesboro, TN (US); Carlton R. Rodrigues, Mt. Juliet, TN (US); Gregory B. Lee, Elgin, SC (US)

(73) Assignee: Schneider Electric USA, Inc., Palatine, IL (US)

( * ) Notice: Subject to any disclaimer, the term of this patent is extended or adjusted under 35 U.S.C. 154(b) by 594 days.

(21) Appl. No.: 12/630,514

(22) Filed: Dec. 3, 2009

(65) Prior Publication Data

US 2011/0132635 A1 Jun. 9, 2011

(51) Int. Cl.
*H01B 5/02* (2006.01)
(52) U.S. Cl. ............... 174/129 B; 174/70 B; 174/72 B; 174/71 B; 174/88 B; 174/99 B; 439/517; 439/212; 439/114; 439/213; 439/210; 439/115; 439/262; 29/592.1; 29/622; 29/623; 29/876
(58) Field of Classification Search .............. 174/70 B, 174/72 B, 71 B, 88 B, 99 B, 129 B; 439/517, 439/212, 114, 213, 210, 115, 262
See application file for complete search history.

(56) References Cited

U.S. PATENT DOCUMENTS

| | | | | |
|---|---|---|---|---|
| 3,376,377 A * | 4/1968 | Fehr, Jr. | ...................... | 174/72 B |
| 3,786,384 A | 1/1974 | Jones | | |
| 4,272,646 A * | 6/1981 | Carlson | ...................... | 174/88 B |
| 4,627,680 A * | 12/1986 | Weimer et al. | .............. | 174/88 B |
| 4,842,533 A * | 6/1989 | Beberman et al. | ............ | 439/213 |
| 4,849,581 A * | 7/1989 | Larkin et al. | ................... | 439/210 |
| 4,886,940 A * | 12/1989 | Gagnon et al. | .............. | 174/88 B |
| 4,945,188 A * | 7/1990 | Jackson | ....................... | 174/16.2 |
| 4,950,841 A | 8/1990 | Walker et al. | | |
| 4,979,906 A * | 12/1990 | Shrout et al. | ................... | 439/213 |
| 5,261,830 A * | 11/1993 | Jego et al. | ...................... | 439/210 |
| 5,579,217 A * | 11/1996 | Deam et al. | ................... | 363/144 |
| 5,760,339 A * | 6/1998 | Faulkner et al. | ............ | 174/88 B |
| 7,819,681 B1 * | 10/2010 | Rodrigues et al. | ............ | 439/213 |
| 8,033,850 B2 * | 10/2011 | O'Leary et al. | ............... | 439/213 |

FOREIGN PATENT DOCUMENTS

GB 2298969 A 9/1996

OTHER PUBLICATIONS

Written Opinion corresponding to International Patent Application No. PCT/US2010/058212, European Patent Office, dated May 12, 2011, 4 pages.
International Search Report corresponding to International Patent Application No. PCT/US2010/058212, European Patent Office, dated May 12, 2011, 4 pages.

* cited by examiner

*Primary Examiner* — Chau Nguyen
*Assistant Examiner* — Theron Milliser
(74) *Attorney, Agent, or Firm* — Nixon Peabody LLP (57) ABSTRACT

A bus assembly and bus assembly connector include one or more insulated members that have axial sleeves that fit within one another during assembly to form a nesting arrangement. The nesting arrangement of the axial sleeves allow reduction of the overall size of the bus assembly connector while satisfying power rating standards and dielectric clearances as well as allowing bolting of the bus assembly to thereby clamp and secure the bus assembly. The axial sleeves can be distinctively designed such that the phase members must be assembled in a predetermined order, with no components being omitted, to form the bus assembly connector or clamp the bus assembly.

18 Claims, 8 Drawing Sheets

NESTING DIELECTRIC INSULATORS

TECHNICAL FIELD

The present disclosure relates generally to electrical distribution equipment and, more particularly, to an electrical system with dielectric insulators in a nesting arrangement.

BACKGROUND

A bus system typically includes two or more bus assemblies, one or more bus assembly connectors, as well as a plurality of plug-in units. Each bus assembly includes one or more phase-conductors and a housing. For example, in a three phase system, the bus assembly may include three live phase-conductors or three live phase-conductors and one neutral-conductor, depending on the type of system architecture being employed. To draw power, various plug-in units or electrical components may be directly connected to one or more plug-in connection sites spaced along the bus assemblies. Each bus assembly connector is used to physically and electrically connect two sections or sets of bus assemblies together.

Current bus assembly connectors are bulky and it is desired that their overall size be decreased. Considering that the dimensions of the phase members cannot be readily altered, one method to decrease the size of the bus assembly connectors is to reduce the spaces between the phase members (referred to herein as the phase spaces). A problem occurs when the existing bus assembly connector is decreased in size to make the overall size of the bus assembly connector more compact. In particular, as a result of decreasing the sizes of the individual phase spaces within the bus assembly connector, an unintended change may occur in the amount of creepage and/or through-air clearance that occurs between the phase members, thereby rendering the bus assembly connector no longer satisfactory for the particular creepage and clearance standards for which it is intended to be used.

A common problem in assembling such bus assembly connectors is that one or more phase members may be incorrectly oriented with respect to the other phase members. Another common problem is that a portion or all of one or more phase members may be placed at the incorrect phase location (i.e. phase A, B, or C) when assembling the bus assembly connector such that a conductor plate of a phase member faces an incorrect phase (e.g. ground conductor being in the wrong position). Another problem that occurs is when a portion of a phase member, such as a conductor plate, is inadvertently omitted when assembling the bus assembly connector. These types of errors may cause the bus assembly connector to operate incorrectly and may cause serious damage to persons or property if used in the overall bus system.

Additionally, bus assemblies, which include phase conductors of the bus assembly sections that are inserted into the bus assembly connectors, which electrically connect two bus assemblies, are in wide use in the commercial settings. The components that form the bus assembly are typically manufactured as having substantially large lengths to allow the bus assembly sections to traverse large areas of a building to carry power. However, the bus assemblies may undergo extreme stresses along their lengths due to electromotive forces generated during a shorting event. Exterior or interior clamping and supports of the bus conductors to protect against shorting EMF displacement may be used. These clamps and supports must of course be provided with adequate dielectric protection.

Thus, a need exists for an improved bus assembly connector and fortifying assembly for use with a bus assembly that satisfies one or more of these needs and solves these problems.

SUMMARY

An aspect of the present disclosure is directed to a bus assembly and bus assembly connector which include one or more dielectric, also referred to sometimes herein as insulating, insulator or insulated; members that have axial sleeves that fit within one another in only one order like a puzzle during assembly to form a nesting arrangement covering a central bolt for holding the conductive, also referred to sometimes herein as bus, or phase bus, members of the bus assembly. The nesting arrangement of the axial sleeves allow reduction of the overall size of the bus assembly connector while satisfying power rating standards as well as allowing bolting of the bus assembly to thereby clamp and secure the bus assembly. The axial sleeves can be distinctively designed and/or have designated colors such that the phase members, must be assembled in a predetermined order, with no components being omitted, to form the bus assembly connector as well as a bus assembly. The axial sleeves can also have features which limit rotation of the insulated members with respect to one another.

The foregoing and additional aspects of the present disclosure will be apparent to those of ordinary skill in the art in view of the detailed description of various aspects, that is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Although the subject matter will be described in connection with certain aspects, it will be understood that the subject matter described herein is not limited to those particular aspects. On the contrary, the inventive subject matter is intended to cover all alternatives, modifications, and equivalent arrangements as may be included within the spirit and scope as defined by the appended claims.

Figure 1:
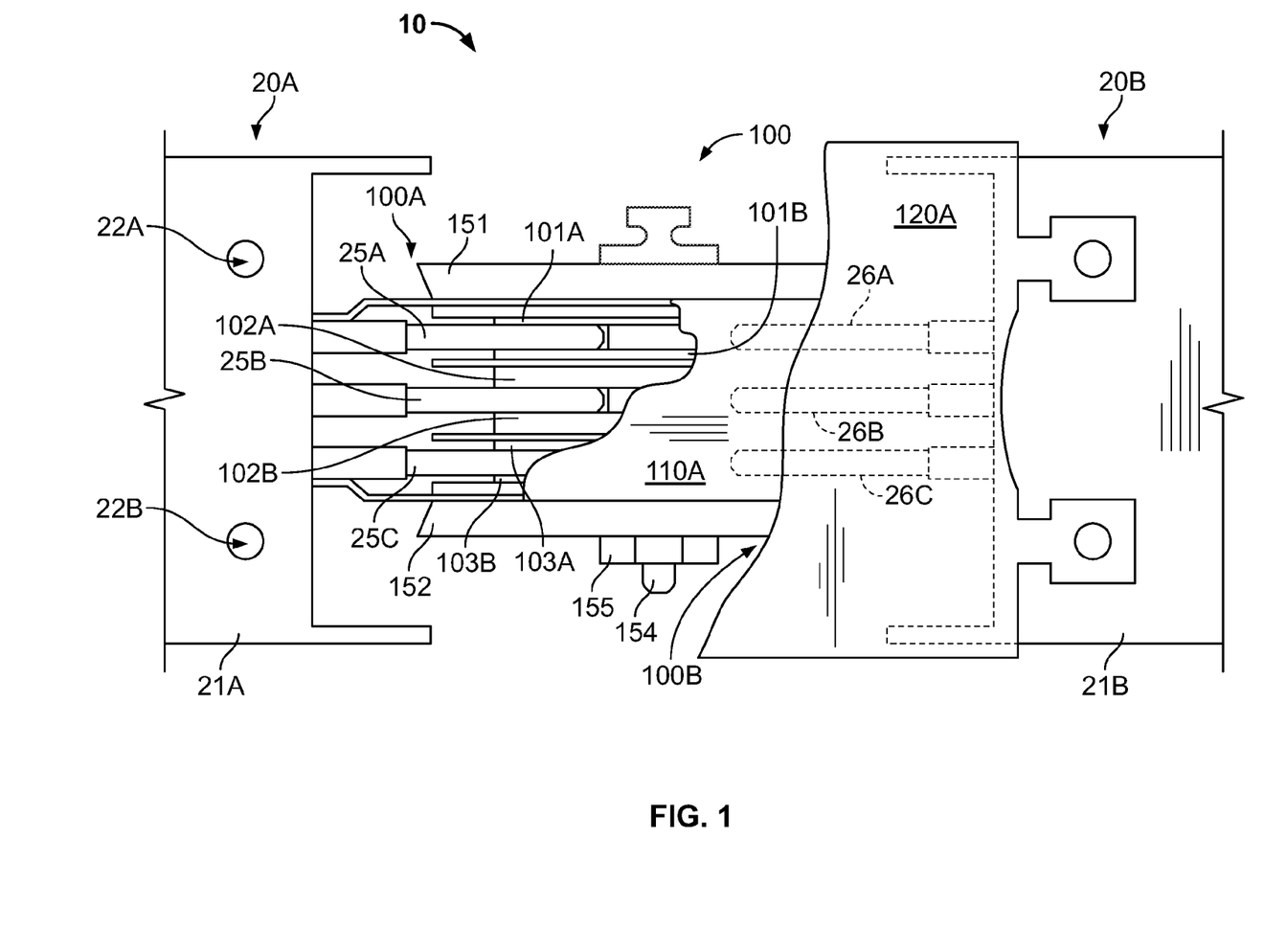
FIG. 1 illustrates a partially exposed view of an overall bus system joint according to one or more aspects of the present disclosure.

Referring to FIG. 1, an exemplary bus system joint 10, in the form of a joint pack for a busway system, is shown. The bus system joint 10 includes a bus assembly connector 100, a first bus assembly section 20A, and a second bus assembly section 20B. The first and the second bus assembly sections 20A, 20B are three-pole bus assemblies and/or three-phase bus assemblies. The first bus assembly section 20A includes a housing 21A and three phase-conductors 25A-25C. Each of the phase-conductors 25A-25C is electrically insulated from each other and the housing 21A. Each of the phase-conductors 25A-25C has at least one exposed end configured to physically and electrically mate with the bus assembly connector 100, as shown in FIG. 1. It should be noted that the bus assembly connector 100 is removable from the phase conductors of the bus assembly sections 25A-25C.

Similarly, the second bus assembly section 20B includes a bus assembly housing 21B and three phase-conductors 26A-26C of the bus assembly sections. Each of the phase-conductors 26A-26C is electrically insulated from each other and from the housing 21B. Each of the phase-conductors 26A-26C has at least one exposed end configured to removably mate with a second opposing end of the bus assembly connector 100 in the same manner as the three phase conductors 25A-25C.

The bus assembly connector 100 is configured to electrically connect the first bus assembly section 20A and the second bus assembly section 20B when both are physically engaged with the bus assembly connector 100. For example, the first phase-conductor 25A of the first bus assembly section 20A is electrically connected with the first phase-conductor 26A of the second bus assembly section 20B, and so on. Although the bus assembly sections and bus assembly connector are shown to be for a three-pole system, a bus assembly section being of a four-pole system includes three phase-conductors and one neutral-conductor (not shown) is contemplated.

Figure 2:
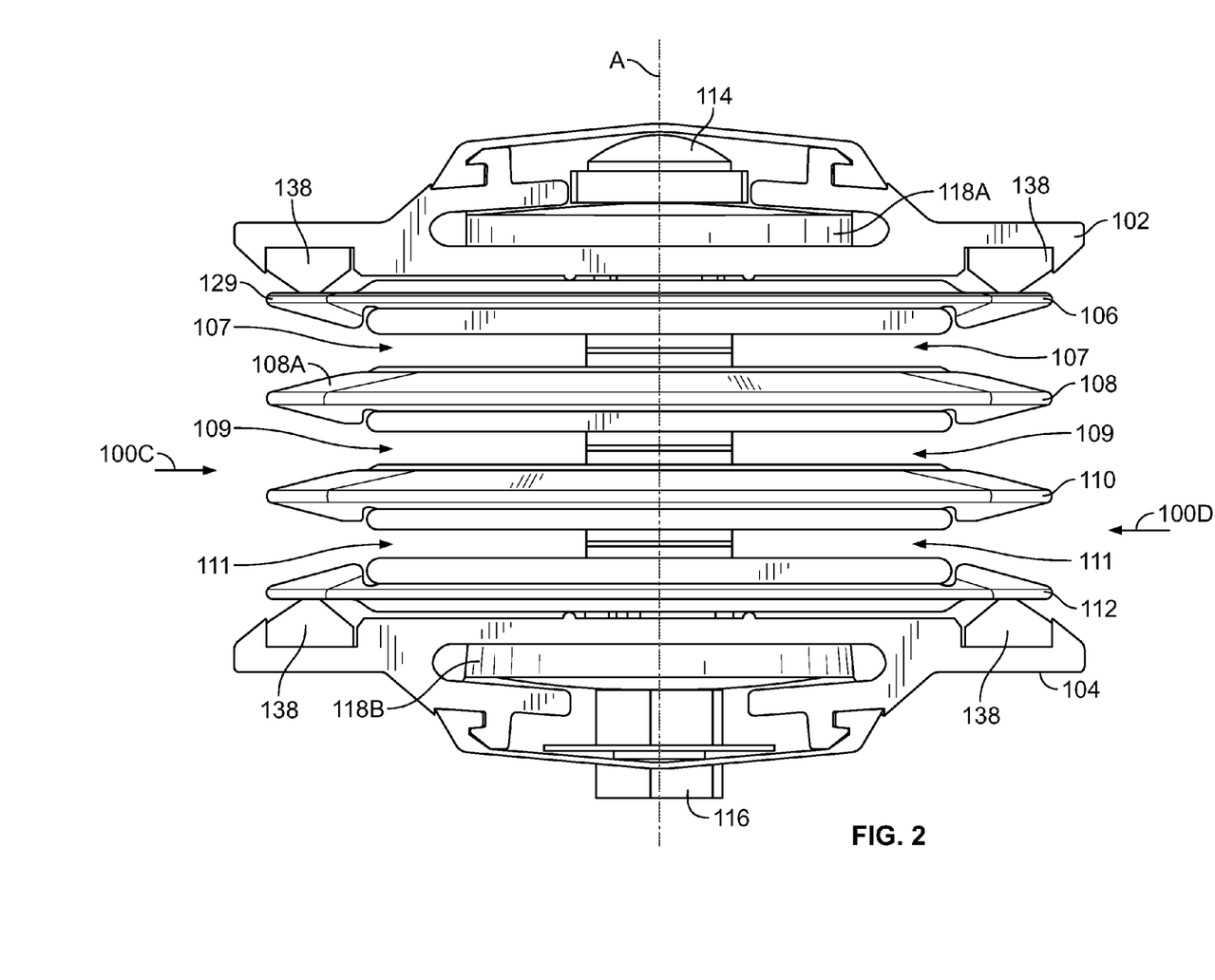
FIG. 2 illustrates a side view of a bus assembly connector in accordance with one or more aspects of the present disclosure.

Referring generally to FIG. 1, the bus assembly connector 100 is shown according to an exemplary configuration of the present disclosure. The bus assembly connector 100 is a multi-phase bus assembly connector, and more particularly, a three-phase bus assembly connector. The bus assembly connector 100 is generally cube-shaped having a top end 100A and an opposing bottom end 100B, a first side 100C (FIG. 2), and a second opposing side 100D (FIG. 2). As shown in FIG. 2, a top bus assembly connector cover 102 is located at the top end 100A and a bottom bus assembly connector cover 104 is located at the bottom end 100B of the bus assembly connector 100.

FIG. 2 illustrates a side view of the bus assembly connector 100 in accordance with one or more aspects of the present disclosure. As shown in FIG. 2, the bus assembly connector 100 includes a plurality of insulating phase members (also referred to as "phase members") 106, 108, 110, 112 coupled to one another and vertically stacked along an axis A between the top bus assembly connector cover 102 and the bottom bus assembly connector cover 104. As will be described in more detail below, a phase member is referred to herein as an insulator plate having a centrally located insulated axial sleeve along with one or more conductor plates disposed on either or both opposed sides of the insulator plate. As shown in FIG. 2, a ground phase member 106 is located immediately below the top bus assembly connector cover 102. Additionally, a ground phase member 112 is positioned immediately above the bottom bus assembly connector cover 104. Additionally, one or more intermediate phase members (although two intermediate phase members 108, 110 are shown in FIG. 2) are located between the ground phase members 106 and 112. The phase members 106, 108, 110, 112 are oriented lengthwise along respective parallel planes that are substantially perpendicular to the direction of axis A.

The phase members 106, 108, 110, 112 along with the top and bottom bus assembly connector covers 102, 104 are secured to one another with a bolt 114 and a nut 116, in that the bolt 114 extends through the central apertures extending through the axial sleeves of the phase members, as discussed below. Additionally, a washer (e.g., a Belleville washer) 118A is positioned between the head of the bolt 114 and the top bus assembly connector cover 102. Similarly, another washer (e.g., a Belleville washer) 118B is positioned between the bottom bus assembly connector cover 102 and the nut 116. It is contemplated that other fasteners and/or washers can be alternatively used. While the bus assembly connector 100 is shown as having a certain number, type, and size of phase members and other components, various other numbers, types, and sizes of phase members and/or other components are contemplated.

In an aspect, the phase members 106, 108, 110, 112 are vertically stacked along the axis A and are vertically separated by spaces that correspond to designated electrical phases of the bus assembly connector 100 (hereinafter referred to as "phase spaces"). In particular, a phase space 107 is located between opposing phase members 106 and 108; whereas a phase space 109 is located between opposing phase members 108 and 110; and a phase space 111 is located between opposing phase members 110 and 112. In the aspect shown in FIG. 2, the phase space 107 is associated with phase A, whereas phase space 109 is associated with phase B, and phase space 111 is associated phase C. Each of the phase spaces 107, 109 and 111 allows a respective phase-conductor of a bus assembly sections, such as one of the phase-conductors 25A-25C, 26A-26C shown in FIG. 1, to be slidably inserted therein to allow electrical connection between the phase conductors of the bus assembly sections.

Figure 3:
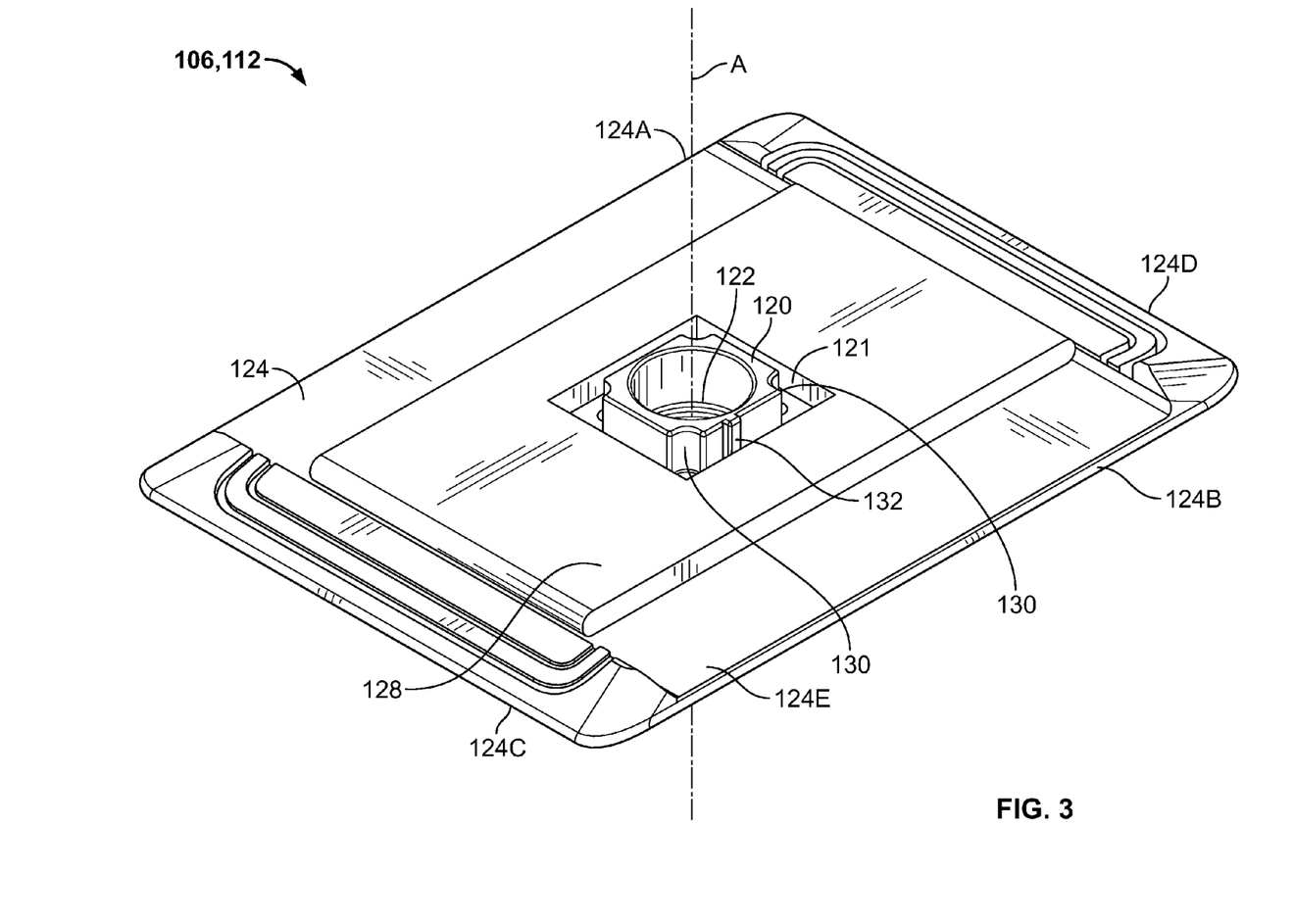
FIG. 3 illustrates a perspective view of a ground phase member in accordance one or more aspects of the present disclosure.

Details of the phase members will now be discussed. FIG. 3 illustrates a perspective of a ground phase member. It should be noted that although the following description is directed to and discussed in light of the ground phase member 106, the same description can be applied to the ground phase member 112 (see FIG. 2). As shown in FIG. 3, the ground phase member 106 includes an insulator plate 124 having a generally flat rectangular shape along with an axial sleeve (also referred to as "sleeve") 120 desirably made of insulator material that protrudes perpendicularly from the insulator plate 124 in the direction along axis A. As shown in FIG. 3, the axial sleeve 120 of the phase member 106 includes a body with a central aperture 122 along the axis A to accommodate insertion of the bolt 114, as described above. The sleeve 120 includes curved notches 130 located at each of the corners of the portion 120 as well as one or more protrusions 132 that runs vertically along the side of the portion 120.

In an aspect of the present disclosure, the insulator plate 124 is formed such that the sleeve 120 is integral with the rest of the plate 124 and thus is considered as one piece. In another aspect, the insulator plate 124 and the sleeve 120 are separately formed components that are coupled to one another to assemble the ground phase member 106.

It should be noted that although the sleeve 120 is shown in FIG. 3 as extending from only one side of the insulator plate 124, it is contemplated that the sleeve 120 extends vertically along axis A on the opposing side of the insulator plate as well. In an aspect, the sleeve 120 has a poka yoke configuration, whereby the sleeve 120 is distinctly shaped to interface only with a sleeve of only one other predetermined phase member. A poka-yoke configuration is referred to herein as a mechanism configuration used in a manufacturing or assembly process that helps an equipment operator avoid mistakes and eliminate product defects by preventing, correcting, or drawing attention to human errors as they occur. More details of the poka yoke configuration are described below.

Figure 4:
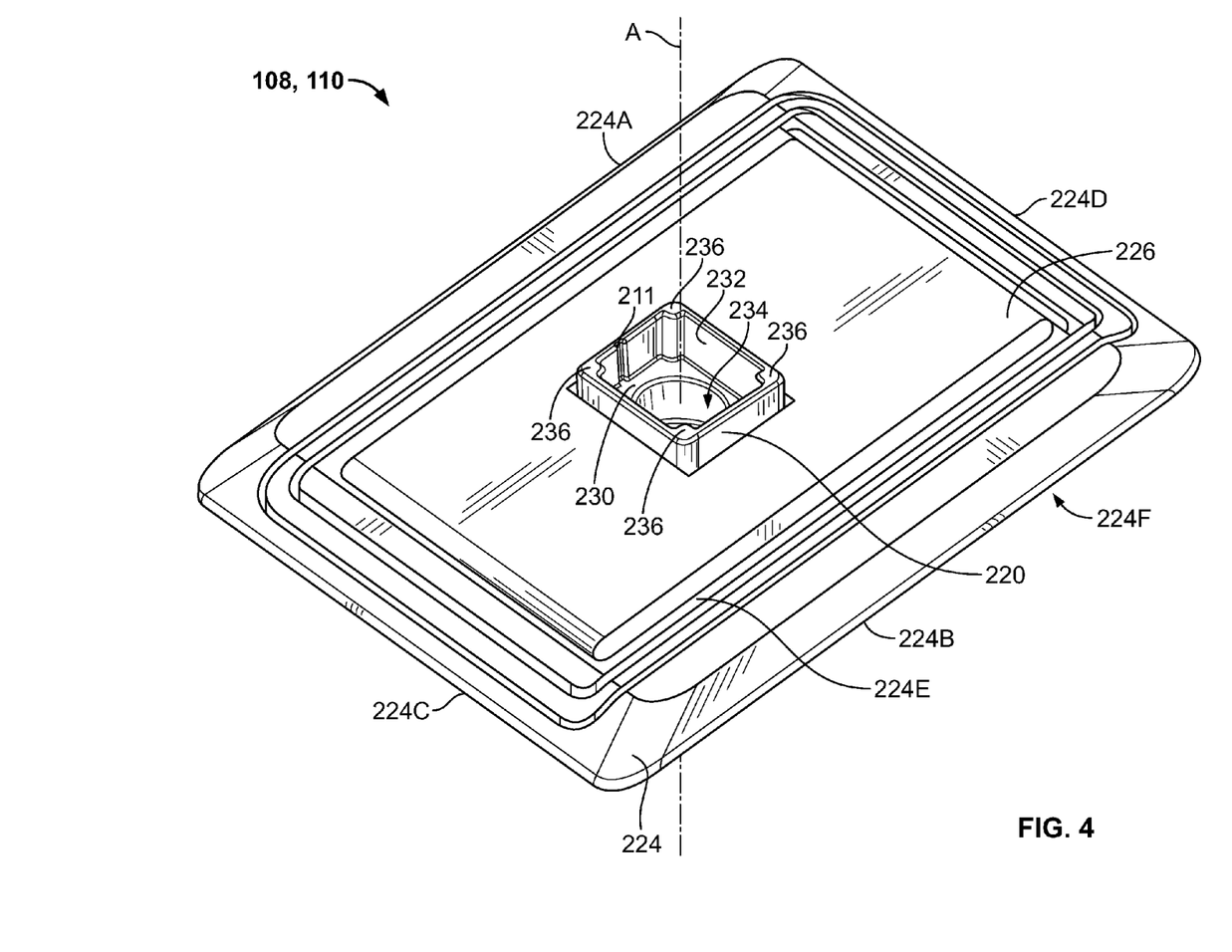
FIG. 4 illustrates a perspective view of a first surface of an intermediate phase member in accordance with one or more aspects of the present disclosure.

FIG. 4 illustrates a perspective view of the intermediate phase member in an aspect of the present disclosure. As discussed, the intermediate phase member is designated as a phase member positioned adjacent to a ground phase member. It should be noted that although the following description is directed toward the intermediate phase member 108, the same description can be applied to the intermediate phase member 110 (see FIG. 2) as well as ground members 106 and 112 (FIG. 3). The intermediate phase member 108 includes an insulator plate 224 having a generally flat rectangular shape along with an axial sleeve 220 desirably made of insulator material that protrudes perpendicularly with the insulator plate 224 in the direction along the axis A. In an aspect, the insulator plate 224 is formed such that the axial sleeve 220 is integral with the rest of the plate 224 and thus is considered as one piece. In another aspect, the insulator plate 224 and the axial sleeve 220 are separately formed components that are coupled to one another to assemble the intermediate phase member 108.

The sleeve 220 shown in FIG. 4 has a square-shaped receptacle 222 defined within the walls 232, whereby the receptacle 230 is in communication with the central aperture 234, oriented along the axis A, that accommodates insertion of the bolt 114, as described above. In addition, the sleeve 220 includes four curved protrusions 236 at each of the corners of the sleeve 220 as well as a keyed slot 211 located on an inside surface of the sleeve 220. It should be noted that sleeve can have any cross-sectional shape and is not limited to the square-shape described above.

As stated above, the example sleeves in FIGS. 3 and 4 emphasize the mirrored, correspondingly mating interfaces of the sleeves that are required to be assembled together to ensure proper assembly of the bus assembly connector. In particular, the dimension of the receptacle 230 is configured such that only sleeve 120 (FIG. 3) is able to be inserted therein. In addition, the shapes and dimensions of the curved protrusions 234 correspond with that of the curved notches 130 such that the protrusions 234 fittingly slide into the notches 130 when the sleeve 120 is inserted into the sleeve 220.

Figure 5:
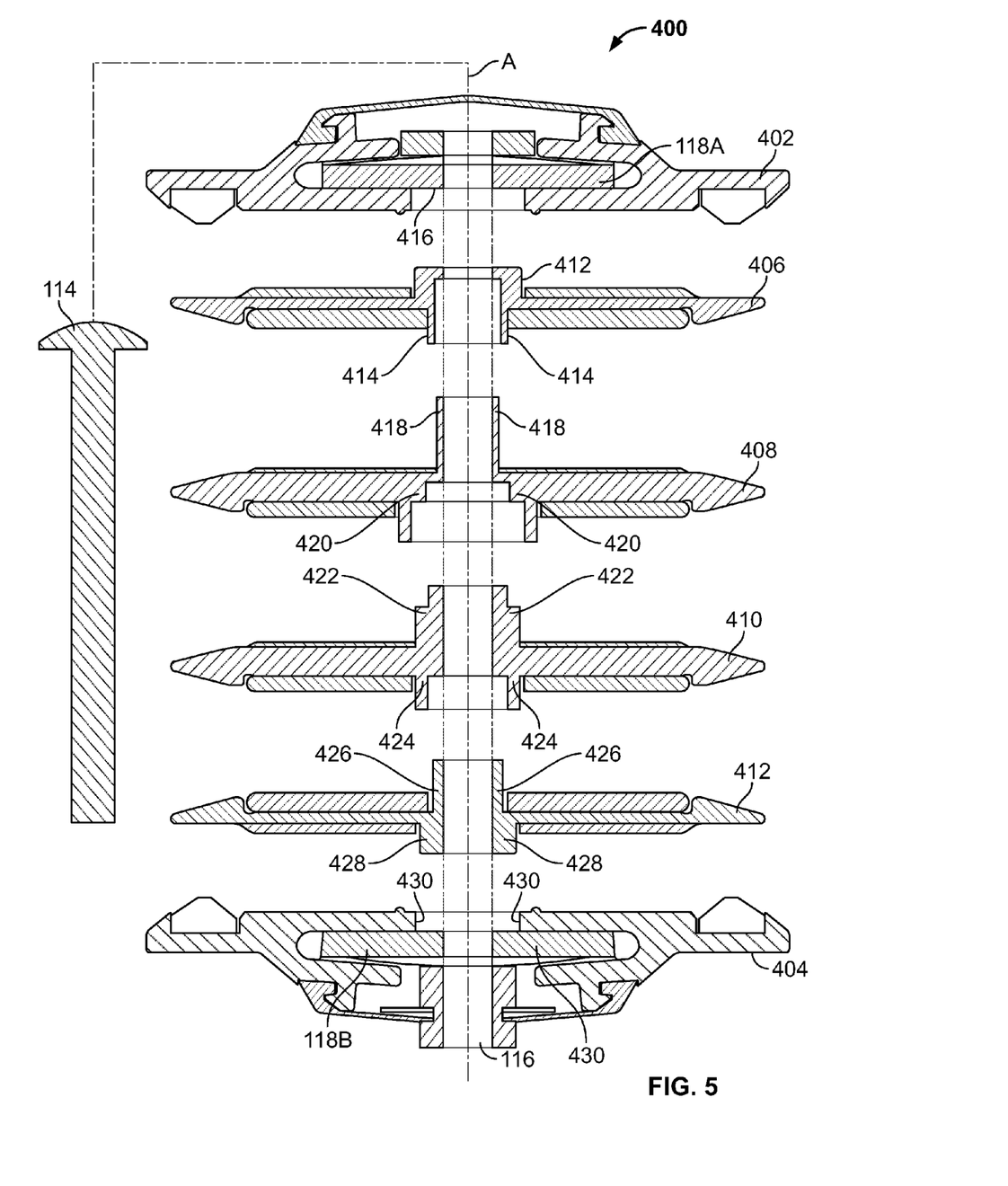
FIG. 5 illustrates an exploded cross sectional view of a bus assembly connector cover in accordance with one or more aspects of the present disclosure.

It should be noted that the phase member 108 not only includes the sleeve 220 on one of the surfaces (as shown in FIG. 4), but also includes the sleeve on the opposing surface (FIG. 5). However, for the present description, only the sleeve 220 is referred to. In an aspect, although not necessary, the sleeves of the intermediate phase member 108 can have poka yoke configurations, whereby each sleeve is distinctly shaped to interface only with a corresponding sleeve of only one other predetermined phase member. More details of the poka yoke configuration are described below.

As shown in FIG. 4, the insulator plate 224 includes a first side 224A and a second opposing side 224B as well as a first end 224C and a second opposed end 224D. Additionally, the insulator plate 224 has a top surface 224E and a bottom surface 224F, both of which extend between sides 224A-224B and ends 224C-224D. The top and bottom surfaces 224E, 224F each desirably receive a conductor plate thereon, as shown in FIGS. 4 and 5. The one or more conductor plates electrically connect the bus assembly connector to the bus assembly sections described above. In particular, a conductor plate 226 is shown disposed on the surface 224E (FIG. 4) whereas a conductor plate is disposed on the bottom surface 224F of the insulator plate 224 (not shown).

The conductor plates 126, 128, 226, 228 can be made of any electrically conducting material, such as, for example, copper, gold, iron, and the like. The insulating plates 106, 108, 110, 112 electrically insulate the A, B, and C phases from one another. The first and the second insulating plates 106 and 108 electrically insulate phase A from the other phases and ground. The second and the third insulating plates 108 and 110 electrically insulate phase B from the other phases. The third and the fourth insulating plates 110 and 112 electrically insulate phase C from the other phases and ground. The insulating plates 106, 108, 110, 112 can be made of any electrically insulating material, such as, for example, plastic, rubber, MYLAR® (biaxially-oriented polyethylene terephthalate), polyvinyl chloride (PVC), bulk molded compound or thermoset, and the like.

As stated above, the present bus assembly connector 100 utilizes nested phase members to decrease the overall height of the bus assembly connector 100 while meeting creepage and clearance limitations mandated by standards (e.g., Underwriters Laboratory (UL) Standard UL 0857). The axial sleeves as well as the insulating plates of each of the phase members are made of an insulating material that have sufficient dielectric breakdown strength and tracking (creepage) resistance to prevent an electrical discharge to creep along surfaces or pass through-air, from one phase to one or more other phases or ground in the bus assembly connector, and vice versa. However, by decreasing the amount of physical space between adjacent phase members, an unacceptable decrease in the amount of creepage distance or through-air clearance can occur, causing the bus assembly connector to fail its standards.

To overcome this potential problem, one or more sleeves of phase members in the bus assembly connector can be configured to at least partially overlap with one or more adjacent sleeves to form the nesting arrangement when the phase members are assembled. By achieving the nesting arrangement, it is possible to pass material through the energized phase members while retaining clearances for purposes of clamping or close proximity design. Further, not only does nesting of phase members reduce the overall spacing of the bus assembly connector, but it allows short circuit measures that are typically not achievable by other means.

In particular, the sleeves of the phase members 106, 108, 110, 112 are designed to fit within one another in a nested arrangement to reduce the height dimensions of the phase spaces, whereby the overlapping sleeves are designed to retain their creepage and clearance capabilities to ensure that the bus assembly connector 100 satisfies the standards and ratings within which it is intended to operate. As will be described in more detail below, the nesting arrangement of insulator components can not only be applied to bus assembly connectors, but also to phase conductors of the bus assembly sections (i.e. 25A-25C; 26A-26C in FIG. 1).

In an example, the ground phase member 106 (FIG. 3) is designed to be vertically stacked and coupled to the intermediate phase member 108 (FIG. 4) in assembling the bus assembly connector 100. In particular to the example, the protruding sleeve 120 of the ground phase member 106 (FIG. 3) is configured to be inserted into the receptacle 230 of the sleeve 220 (FIG. 4), whereby the sleeves 120 and 220 at least partially overlap when coupled together. This vertical overlapping of the sleeves 120 and 220 creates a nested arrangement between them and effectively reduces the vertical spacing between the phase members 106 and 108. By each of the sleeves 106, 108 having predetermined dielectric rating characteristics, the nested arrangement of the sleeves 106, 108 will maintain the desired dielectric creepage and clearance ratings of the bus assembly connector. Although the example only describes nesting of the ground phase member 106 and the intermediate phase member 110, it is contemplated, in another aspect, that each and every phase member used in the bus assembly connector 100 have sleeves designed to form a nesting arrangement with the sleeves with which they are to be coupled with when assembling the bus assembly connector 100.

Although the nesting arrangement can be achieved with sleeves that are not distinctive from one another (thereby allowing any phase member to be vertically stacked with any other phase member), it is contemplated that the sleeves can have poka yoke configurations. Accordingly, in an aspect, one or more of the sleeves are distinctively different from other sleeves to require that they be coupled in a predetermined order and assembled configuration. It is contemplated that the phase members have designated colors and/or patterns to aid the user in proper assembly. FIG. 5 illustrates an exploded cross-sectional view of a bus assembly connector 400 having phase members with poka yoke features or configurations in accordance with an aspect of the present disclosure. As shown in FIG. 5, each of the phase members 406, 408, 410 and 412 includes sleeves that are distinctly different from one another such that each sleeve will only fit with only one other sleeve of another predetermined phase member. In an aspect, it is contemplated that all of the phase members have poka yoke features such that all the phase member are required in assembling the bus assembly connector 400.

As discussed above, each phase member 406, 408, 410, 412 includes an axial sleeve that extends in a vertical direction with respect to the planar insulating plate, whereby each axial sleeve includes a top interface area and a bottom interface area. In particular, the ground phase member 406 includes an axial sleeve with a top interface 412 and a bottom interface 414. The intermediate phase member 408 includes an axial sleeve with a top interface 418 and a bottom interface 420. The intermediate phase member 410 includes an axial sleeve with a top interface 422 and a bottom interface 424. The ground phase member 412 includes an axial sleeve with a top interface 426 and a bottom interface 428. It should be noted that the number of components in the bus assembly connector 400 is an example and more or fewer components may be alternatively be used.

Similarly, the distinctive cross-sectional shape and dimensions of the bottom interface 414 of intermediate phase member 406 are such that the bottom interface 414 will only receive and mate with the top interface 418 of the intermediate phase member 408. In other words, attempting to insert the top interface 422, the bottom interface 424 or any other interface (except for interface 418) into interface 414 will not allow the intermediate phase member 408 to mate or couple with those other interfaces. Thus, considering that the top interface 418 mirrors with and fits into the contour, shape and dimensions of bottom interface 414, only those two predetermined interfaces are to be coupled to one another in assembling the bus assembly connector 400.

Similarly, the distinctive cross-sectional shape and dimensions of the bottom interface 414 of intermediate phase member 408 are such that the bottom interface 414 will only receive and be coupleable to the top interface 418 of the intermediate phase member 408. In other words, one who attempts to insert the top interface 422, the bottom interface 424 or any other interface (except for interface 418) into the interface 414 would find that the intermediate phase member 408 would not mate or couple with those other interfaces. Thus, considering that the top interface 418 mirrors the contour, shape and dimensions of bottom interface 414, those two predetermined interfaces are to be coupled to one another only in assembling the bus assembly connector 400.

In addition to the top interface 418, the axial sleeve of phase member 408 includes a stepped bottom interface 420. As can be seen in FIG. 5, the stepped configuration of the bottom interface 420 is distinctly different than any of the other top and bottom interfaces, except for the top interface 422 of phase member 410 that mirrors with and fits into the stepped configuration of bottom interface 420. Thus, the top interface 422 of the phase member 410 mates with the stepped bottom interface 420 of the intermediate phase member 408 when assembling the bus assembly connector 400.

As shown in FIG. 5, the bottom interface 424 of the intermediate phase member 410 has a notched receiving area, whereby the notched receiving area has a distinctive configuration and dimension that allows only the top interface 426 of the ground phase member 412 to be inserted therein to couple the two phase members 410, 412 together. Additionally, the bottom interface 428 of the ground phase member 412 has a shape and dimension that is distinctively different than any of the other top or bottom interfaces. In particular, the bottom interface 428 is shaped only to fit within the aperture 430 of the bus assembly connector cover 404 when the bus assembly connector 400 is assembled.

As discussed above, each of the axial sleeves has top and bottom interfaces that are distinctive in shape, dimension and contour and that fit into the top or bottom interface of another adjacent predetermined phase member, such that each top and bottom interface must couple to the predetermined shaped interface of a predetermined phase member in order to successfully assemble the bus assembly connector 400. Further, although not necessary, the axial sleeves can be designed such that one or more phase members cannot be omitted when assembling the bus assembly connector 400 as the components will not securely fasten together. It should be noted that the above description in FIG. 5 is only exemplary to show the effectiveness of the poka-yoke features incorporated by the bus assembly connector, and it is contemplated that any combination of shapes, dimensions, order of parts, number of parts can be utilized in achieving the poka-yoke features without being limited to the discussion herein. Although it is desired that all of the axial sleeves are distinct from one another, it is contemplated that fewer than all the axial sleeves can have a poka yoke configuration. As previously mentioned, the axial sleeves, with or without the poka yoke features, are desirably configured to fit within one another in a nesting arrangement to reduce the phase spaces and thus overall height of the bus assembly connector.

Additionally, although not necessary, the phase members are configured such that they must be oriented properly when the phase members are coupled together. For example, the axial sleeve 120 (FIG. 3) can include a protrusion 132 that slidably fits within corresponding slot 211 in axial sleeve 220 (FIG. 4) to ensure that the phase members 106 and 108 are properly oriented. Additionally, the interlocking features of the axial sleeves 120, 220 limit or prevent the phase members 106, 108 from rotating about one another about the axis A when coupled to one another. It should be noted that the illustrated and described configurations of the axial sleeve and their respective interfaces are merely exemplary, it should be appreciated that the axial sleeves and their respective interfaces can have any type of shape, configuration and/or dimension, and is thus not limited to those shown in the Figures herein.

Assembly of the bus assembly connector will now be discussed with reference to the poka yoke aspect illustrated and discussed in connection with FIG. 5. The components of the bus assembly connector 400 are arranged and/or stacked from the top bus assembly connector cover 402 through the bottom bus assembly connector cover 404: the top bus assembly connector cover 402; the ground phase member 406; the first intermediate phase member 408; the second intermediate phase member 410; the ground phase member 412; the bottom bus assembly connector cover 404; the bolt 114, the nut 116 and the washers 118A and 118B. In addition, it should be noted that each phase member 406, 408, 410 and 412 is associated with one or more conductor plates, which are assumed to be already be coupled to the respective phase members 406, 408, 410 and 412.

During the assembly, ground phase member 412 is coupled with the bottom bus assembly connector cover 404 by inserting the bottom interface 428 into the receiving aperture 430. The bottom interface 424 of the intermediate phase member 410 is coupled only with the top interface 426 of the ground phase member 412, where at least a portion of the bottom interface 424 is inserted into and received by the top interface 426 such that the interfaces 424 and 426 nest with one another. The bottom interface 420 of the intermediate phase member 408 is coupled only with the top interface 422 of the intermediate phase member 410, where at least a portion of the bottom interface 420 is inserted into and received by the top interface 422 such that the interfaces 420 and 422 nest with one another. The bottom interface 414 of ground phase member 406 is coupled only with the top interface 418 of the intermediate phase member 408, where at least a portion of the bottom interface 414 is inserted into, and thus received by, the top interface 418 such that the interfaces 414 and 418 nest with one another. Following, the top interface 412 of ground phase member 406 is inserted into and coupled only with the receiving aperture 416 of the top bus assembly connector cover 402.

Considering that the insulated axial sleeves of adjacent phase members 406, 408, 410 and 412 vertically overlap with one another along the axis A, there are no spacings or breaks between phase members which lack dielectric or insulator material. The nesting arrangements of the axial sleeves of phase members 406, 408, 410, and 412 form a continuous vertical dielectric insulator between the ground phase member 406 and ground phase member 412 with sufficient dielectric clearances as mandated by standards.

Stacking the components in the preceding order automatically aligns the respective central apertures along the axis A, whereby the washers 118A and 118B are positioned within the bus assembly connector covers 402, 404. A bolt 114 can be slid along the axis A through the common central aperture positioned approximately at a center of the bus assembly connector 100. The bolt 114 and the nut 116 are tightened to secure the components together, thereby defining the respective spaces of each of the pairs of opposing phase members 406, 408, 410 and 412 for slidably engaging therebetween a phase-conductor of a bus system. Tightening the bolt 114 and the nut 116 compresses the washers 118A, 118B, which aids in distributing the compressive load of the bolt 114 and the nut 115, as well as securing or locking the nut 116 in place to prevent an accidental loosening of the nut 115 during use of the bus assembly connector 400 in the bus system 10.

It should be noted that although a particular order is discussed above with regard to the assembly of the bus assembly connector 400 (i.e. beginning from the bottom bus assembly connector cover upwards toward the top bus assembly connector cover), it is contemplated that the assembly can begin at the top bus assembly connector cover or anywhere between the top and bottom bus assembly connector covers. For example only, it is possible that assembly begins with coupling of phase members 408 and 410, whereby the remaining components are vertically stacked to the coupled phase members 408 and 410.

Figure 6:
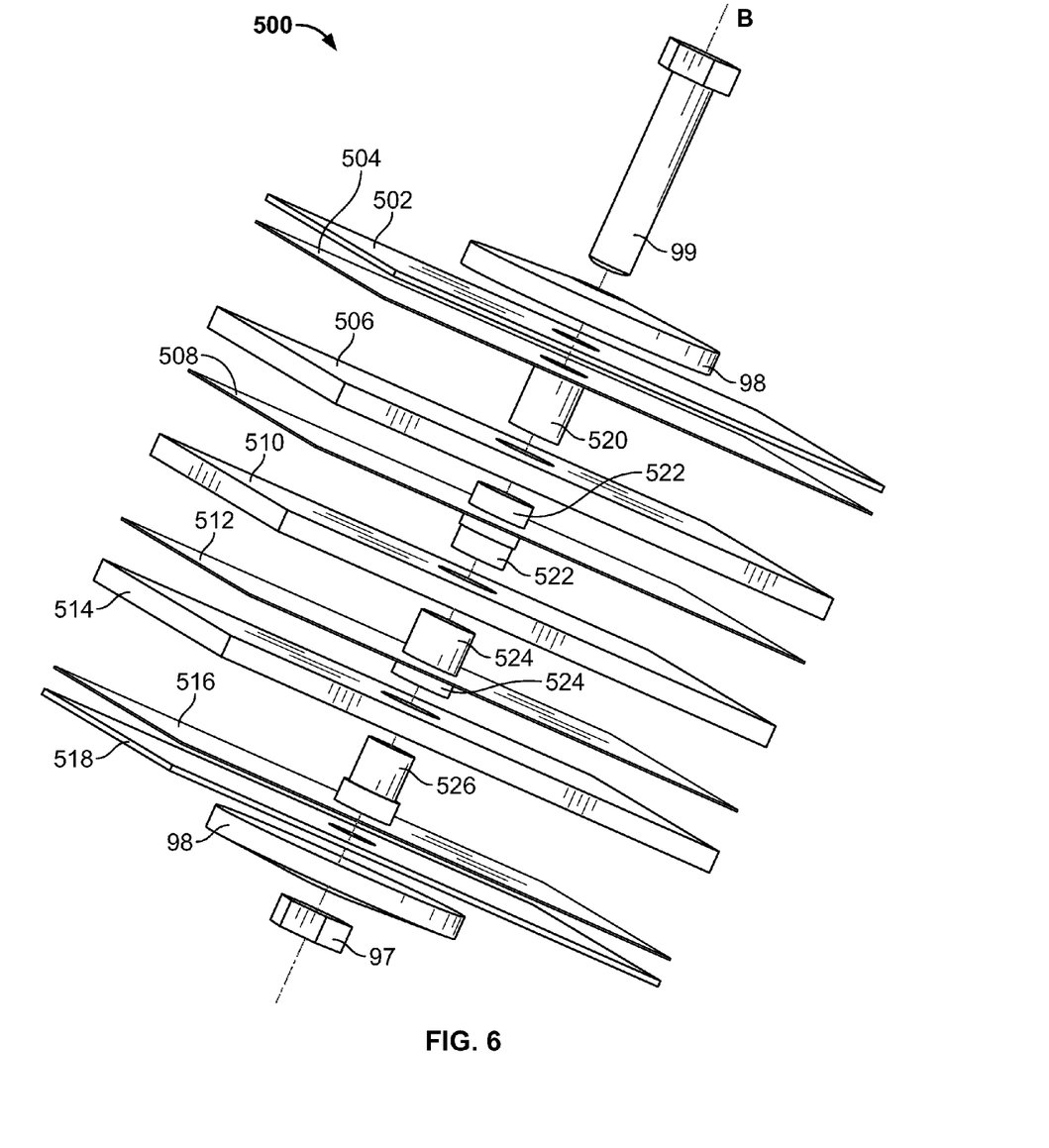
FIG. 6 illustrates an exploded perspective view of a bus assembly in accordance with one or more aspects of the present disclosure.

As discussed above, the nesting arrangement can also be applied to the phase conductors, i.e., phase buses, of a bus assembly (i.e., 25A-25C; 26A-26C in FIG. 1). FIG. 6 illustrates an exploded view of a portion of a bus assembly of a bus assembly section in accordance with an aspect of the present disclosure where bus phase conductors 506, 510, 514 are secured against EMF shorting displacement by a center nut and bolt 97, 99 respectively, and suitable nesting dielectrics 504, 508, 512, 516 as further explained below. The bus assembly section 500 includes housings 502 and 518 with a phase A bus (conductor) 506, a phase B bus (conductor) 510, and a phase C bus (conductor) 514, all of which are positioned between the housings 502 and 518. Additionally, a first phase (insulator) member 504 is positioned between the housing 502 and the phase A bus 506. A second phase (insulator) member 508 is positioned between the phase A bus 506 and the phase B bus 510. Further, a third phase (insulator) member 512 is positioned between the phase B bus 510 and the phase C bus 514. Moreover, a fourth phase (insulator) member 516 is positioned between the phase C bus 514 and the housing 518. It should be noted that the bus assembly 500 shown in FIG. 6 is exemplary, and a fewer or greater number of phase (insulator) members and/or phase buses (conductors) may be utilized. A pair of washers 98 are disposed adjacent to housings 502 and 518, whereby a metallic bolt 99 is slidably inserted into the commonly aligned apertures of the individual components. A nut 97 couples to the bolt 99 to secure the components together in a sandwiched fashion.

In general, each phase (insulator) member shown in FIG. 6 includes an insulated axial sleeve with an aperture along the axis B. Further, each insulator member includes a substantially flat rectangular insulator plate that is desirably integral with the axial sleeve and extends along a plane substantially perpendicular to the axial sleeve. In particular, the insulator member 504 includes an axial sleeve 520; the insulator member 508 includes an axial sleeve 522; the insulator member 512 includes an axial sleeve 524; and the insulator member 516 includes an axial sleeve 526. Although the axial sleeves 520, 522, 524 and 526 are shown to have a circular cylindrical cross-section along axis B, it is contemplated that one or more of the axial sleeves 520, 522 524, 526 include a header portion which traverses along the plane parallel to the insulator member and comes into contact with the bus (conductor) member, as further described below.

It should be noted that the plane insulator members and the axial sleeves can be any size or cross-sectional shape dictated by electrical and mechanical needs. In an aspect, one or more of the axial sleeves are configured to fit at least partially within one or more other axial sleeves to create a nesting assembly. Further, it is contemplated that one or more of the axial sleeves can have distinctive poka yoke configurations that require that their insulator members be located adjacent to one or more predetermined bus members and coupled together in a predetermined order when assembling the bus assembly.

Figure 7:
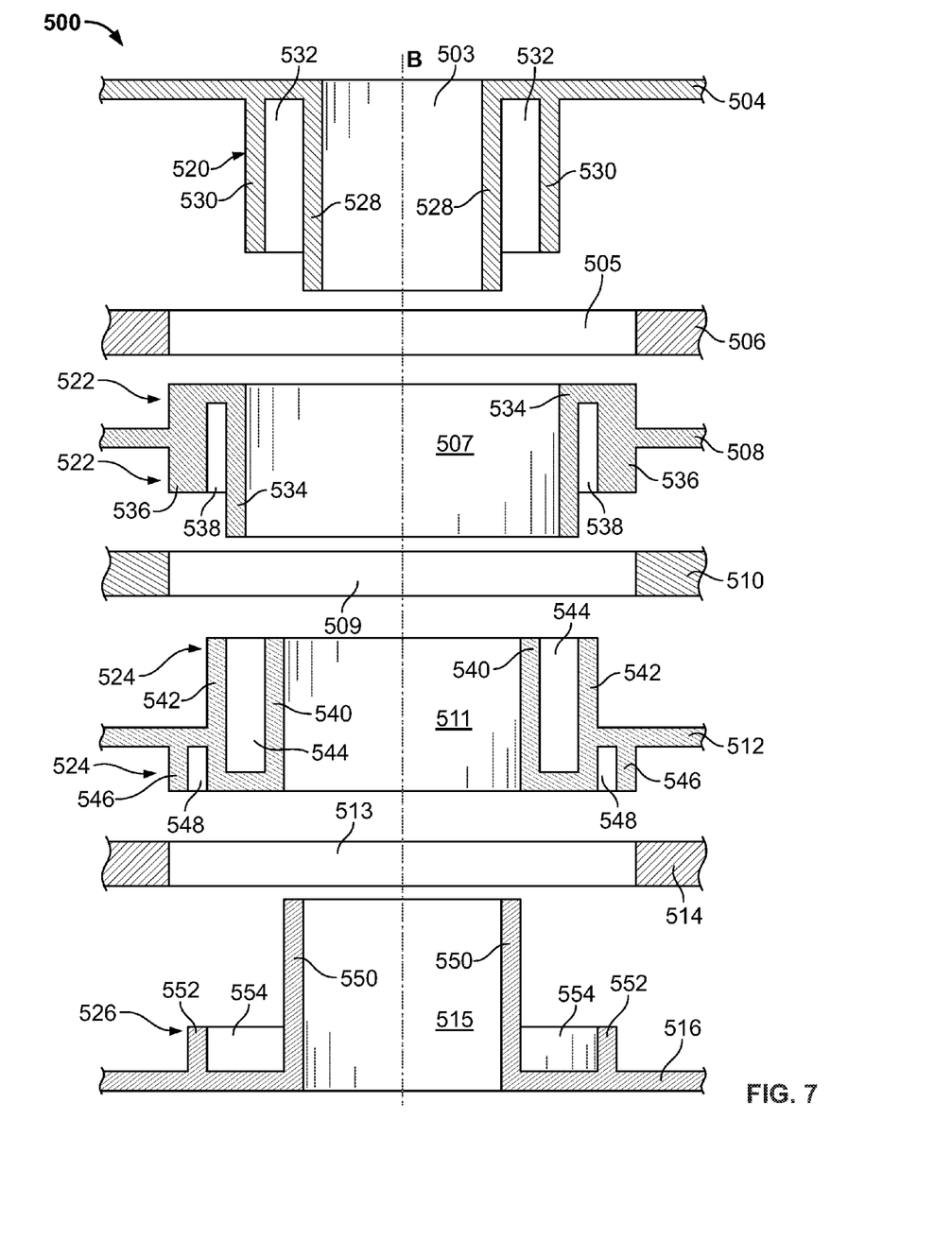
FIG. 7 illustrates an exploded cross-sectional view of a portion of the bus assembly on FIG. 6 in accordance with one or more aspects of the present disclosure.

FIG. 7 illustrates an exploded cross-sectional view of a portion of the bus assembly 500 in accordance with an aspect of the present disclosure. As shown in FIG. 7, the axial sleeve 520 of the first insulator member 504 includes an aperture 503 within a circular-shaped first inner wall 528, whereby the aperture 503 allows the bolt 99 to be slidably inserted therethrough along the axis B. The sleeve 520 also includes a first outer circular wall 530 that is concentric with the first inner wall 528 about axis B, whereby a circular-shaped first receiving area 532 is located between the first inner and first outer walls 528, 530.

Additionally, the sleeve 522 of the second insulator member 508 includes an aperture 507 within a circular-shaped second inner wall 534. The sleeve 522 also includes a second outer circular-shaped wall 536 that is concentric with the second inner wall 534 about the axis B, whereby a circular-shaped second receiving area 538 is located between the second inner and second outer walls 534, 536.

As shown in FIG. 7, the sleeve 524 of the third insulator member 512 includes an aperture 511 within a circular-shaped third inner wall 540. The sleeve 524 also includes a circular-shaped third intermediate wall 542 that is concentric with the third inner wall 540 about the axis B, whereby a circular-shaped third inner receiving area 544 is located between the third inner and second outer walls 540, 542. Additionally, a circular-shaped third outer wall 546 concentric with walls 540 and 542 is located at an outer-most diametric position of the sleeve 524, with respect to the axis B. The third outer wall 546 is positioned a distance to form circular-shaped third outer receiving area 548 between walls 542 and 546.

Further, the sleeve 526 of the fourth insulator member 516 includes an aperture 515 within a circular-shaped fourth inner wall 550 about the axis B. The sleeve 526 also includes a circular-shaped fourth outer wall 552 that is concentric with the fourth inner wall 550 about the axis B, whereby a circular-shaped fourth receiving area 534 is located between the walls 550 and 552.

Figure 8:
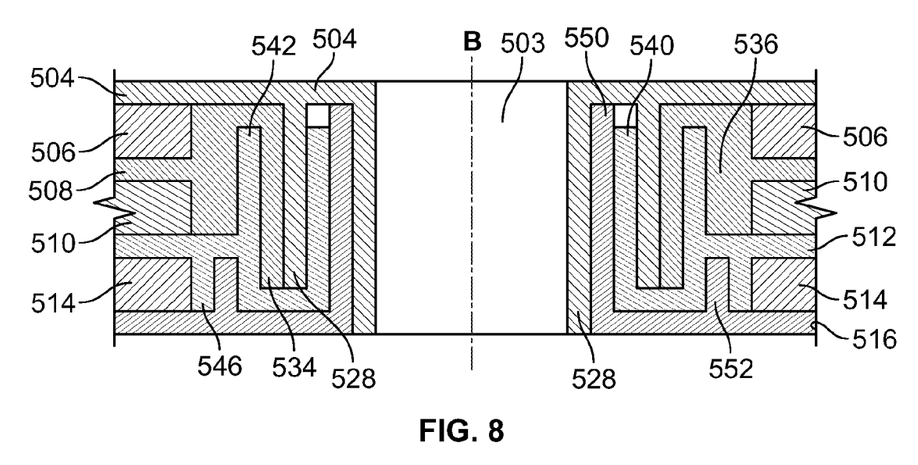
FIG. 8 illustrates a cross-sectional view of a portion of the bus assembly on FIGS. 6 and 7 in accordance with one or more aspects of the present disclosure.

In the example, each axial sleeve is designed such that predetermined walls and/or receiving areas of one or more other axial sleeves fit in a designated location to create a nesting arrangement. FIG. 8 illustrates the axial sleeves in FIG. 7 in the assembled state in accordance with an aspect of the present disclosure.

In particular, as shown in FIG. 8, with respect to the sleeve 503, the third wall 540 and the second wall 550 nest within the receiving area 532 (FIG. 7) of the first insulator 504. From FIG. 7, additionally, the fourth wall 530 and the fifth wall 534 nest within the receiving area 544 of the third insulator 512. Further, the sixth wall 542 nests within the receiving area 538, whereas the fourth outer wall 552 nests within the third outer receiving area 548. As shown, each axial sleeve is designed such that all the insulator members must be coupled in a predetermined order with each insulator member at a predetermined vertical position with respect to the remaining insulator members.

The several overlapping, nested axial sleeves allow the insulator material to interface between the energized phase bus assemblies along the axis B while retaining the dielectric clearances necessary for purposes of clamping the bus assemblies for short circuit bracing. The nesting arrangement allows the metallic bolt 99 to pass through the closely spaced phase buses to clamp or otherwise secure the components of the bus assembly together without compromising the dielectric clearance and creepage ratings. The particular nested arrangement shown in FIG. 8 is based on the particular voltage and power ratings with which the bus assembly 500 is to be used, and therefore may be altered depending on the particular required voltage and power ratings of the bus assembly 500.

While particular aspects and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the present disclosure as defined in the appended claims.

What is claimed is:

1. A bus assembly connector comprising:
a first phase member including a first insulated axial sleeve having a first top interface and a first bottom interface and a first aperture oriented along an axis, the first phase member including a first insulator plate extending from the axial sleeve along a first plane substantially perpendicular to the axis;
a second phase member including a second insulated axial sleeve having a second top interface and a second bottom interface and a second aperture oriented along the axis, the second phase member including a second insulator plate extending from the second axial sleeve along a second plane parallel to the first plane, the first and second phase members coupled to one another along the axis and having a first phase space therebetween, wherein the first and second axial sleeves vertically overlap along the axis in a nesting arrangement; and
a third phase member including a third insulated axial sleeve having a third top interface and a third bottom interface and a third aperture oriented along the axis, the third phase member including a third insulator plate extending from the third axial sleeve along a third plane parallel to the first and second planes, the third axial sleeve including an inner wall, an intermediate wall and an outer wall each concentrically spaced about the axis, the third axial sleeve including an inner receiving area between the inner wall and the intermediate wall and an outer receiving area between the intermediate wall and the outer wall, the third phase member coupled to the second phase member along the axis and having a second phase space therebetween, wherein the second and third axial sleeves vertically overlap along the axis.

2. The bus assembly connector of claim 1, wherein the first bottom interface of the first axial sleeve is distinctly configured to only mate with the second top interface of the second axial sleeve, and the second bottom interface is distinctly configured to only mate with the third top interface of the third axial sleeve.

3. The bus assembly connector of claim 1, wherein the first axial sleeve, the second axial sleeve and the third axial sleeve are distinctly shaped such that the first axial sleeve, the second axial sleeve and the third axial sleeve are required to be positioned in a predetermined orientation with one another and coupled together in a predetermined order to assemble the bus assembly connector.

4. The bus assembly connector of claim 1, wherein the first, second and third axial sleeves overlap to form a continuous insulated axial sleeve between the first and third phase members, wherein the continuous insulated axial sleeve is continuous along the axis.

5. The bus assembly connector of claim 1, wherein the first and second axial sleeves include interlocking features which limit rotation of the first phase member with respect to the second phase member about the axis.

6. A bus assembly comprising:
a first insulator member including an insulated first axial sleeve oriented along an axis, the first insulator member including a first insulator plate extending from the first axial sleeve along a first plane substantially perpendicular to the axis;
a second insulator member including an insulated second axial sleeve oriented along the axis, the second insulator member including a second insulator plate extending from the second axial sleeve along a second plane parallel to the first plane;
a first phase bus having a first bus aperture oriented along the axis, the first phase bus positioned between the first and second insulator members such that the first bus aperture, the first axial sleeve and the second axial sleeve are aligned along the axis, wherein the first and second insulator members are coupled to one another and sandwich the first phase bus therebetween, wherein the first and second axial sleeves vertically overlap along the axis in a nesting arrangement; and
a third insulator member coupled to the first and second insulator members, the third insulator member including an insulated third axial sleeve oriented along the axis, the third insulator member including a third insulator plate extending from the third axial sleeve along a third plane parallel to the first and second planes, the third axial sleeve including a third inner wall, a third intermediate wall and a third outer wall each concentrically spaced about the axis, the third axial sleeve including a third inner receiving area between the third inner wall and the third intermediate wall and a third outer receiving area between the third intermediate wall and the third outer wall.

7. The bus assembly of claim 6, wherein the first axial sleeve includes at least a first inner wall and a first outer wall concentrically spaced with one another about the axis, the first axial sleeve including a first receiving area between the first inner wall and the first outer wall, wherein the third inner wall of the third axial sleeve is received in the first receiving area.

8. The bus assembly of claim 7, wherein the second axial sleeve includes at least a second inner wall and a second outer wall concentrically spaced with one another about the axis, the second axial sleeve including a second receiving area between the second inner wall and the second outer wall, wherein the third intermediate wall of the third axial sleeve is received in the second receiving area.

9. The bus assembly of claim 8, further comprising a fourth insulator member coupled to the first, second and third insulator members, the fourth insulator member including a fourth axial sleeve having a fourth inner wall and a fourth outer wall concentrically spaced with one another about the axis, the fourth axial sleeve including a fourth receiving area located between the fourth inner wall and the fourth outer wall.

10. The bus assembly of claim 9, wherein the fourth outer wall is received in the third outer receiving area, and wherein the third inner wall and the third intermediate wall are at least partially received in the fourth receiving area.

11. The bus assembly of claim 9, further comprising:
a second phase bus sandwiched between the second and third insulator members; and
a third phase bus sandwiched between the third and fourth insulator members.

12. The bus assembly of claim 6, wherein the first and second axial sleeves include at least one feature to limit rotation of the first insulator member with respect to the second insulator member about the axis.

13. The bus assembly of claim 6, wherein the first axial sleeve, the second axial sleeve and the third axial sleeve are distinctly shaped such that the first axial sleeve, the second axial sleeve and the third axial sleeve are required to be positioned in a predetermined orientation with one another and coupled together in a predetermined order to assemble the bus assembly.

14. The bus assembly of claim 6, wherein the first, second and third axial sleeves overlap to form a continuous insulated axial sleeve between the first and third insulator members, wherein the continuous insulated axial sleeve is continuous along the axis.

15. A method of assembling a bus assembly connector, the method comprising:
selecting a first phase member including a first insulated axial sleeve having a first top interface and a first bottom interface and a first aperture oriented along an axis, the first phase member including a first insulator plate extending from the axial sleeve along a first plane substantially perpendicular to the axis;
selecting a second phase member including a second insulated axial sleeve having a second top interface and a second bottom interface and a second aperture oriented along the axis, the second phase member including a second insulator plate extending from the second axial sleeve along a second plane parallel to the first plane;
selecting a third phase member including a third insulated axial sleeve having a third top interface and a third bottom interface and a third aperture oriented along the axis, the third phase member including a third insulator plate extending from the third axial sleeve along a third plane parallel to the first and second planes, the third axial sleeve including an inner wall, an intermediate wall and an outer wall each concentrically spaced about the axis, the third axial sleeve including an inner receiving area between the inner wall and the intermediate wall and an outer receiving area between the intermediate wall and the outer wall;
coupling the first and second phase members together along the axis and having a first phase space therebetween, wherein the first and second axial sleeves vertically overlap along the axis in a nesting arrangement; and
coupling the second and third phase members together along the axis and having a second phase space therebetween, wherein the second and third axial sleeves vertically overlap along the axis.

16. The method of claim 15, wherein the first phase member, the second phase member and the third phase member are oriented in a predetermined position and coupled to one another in a predetermined order.

17. A method of forming a bus assembly, the method comprising:
selecting a first insulator member including an insulated first axial sleeve with a first aperture oriented along an axis, the first insulator member including a first insulator plate extending from the first axial sleeve along a first plane substantially perpendicular to the axis;
selecting a second insulator member including an insulated second axial sleeve with a second aperture oriented along the axis, the second insulator member including a second insulator plate extending from the second axial sleeve along a second plane parallel to the first plane;
selecting a third insulator member including an insulated third axial sleeve with a third aperture oriented along the axis, the third insulator member including a third insulator plate extending from the third axial sleeve along a third plane parallel to the first plane, the third axial sleeve including an inner wall, an intermediate wall and an outer wall each concentrically spaced about the axis, the third axial sleeve including an inner receiving area between the inner wall and the intermediate wall and an outer receiving area between the intermediate wall and the outer wall;

positioning a first phase bus, having a first bus aperture, between the first and second insulator members such that the first bus aperture, the first aperture and the second aperture are aligned along the axis;

positioning a second phase bus, having a second bus aperture, between the second and third insulator members such that the second bus aperture, the second aperture and the third aperture are aligned along the axis;

coupling the first and second insulator members to one another to sandwich the first phase bus between the first and second insulator members, wherein the first and second axial sleeves vertically overlap along the axis in a nesting arrangement; and coupling the second and third insulator members to one another to sandwich the second phase bus between the second and third insulator members, wherein the second and third axial sleeves vertically overlap along the axis in a nesting arrangement.

18. The method of claim 17, wherein the first insulator member, the second insulator member and the third insulator member are oriented in a predetermined position and coupled to one another in a predetermined order.

* * * * *